June 28, 1955 G. W. JOHANSEN ET AL 2,711,807
REVERSING CLUTCH UNIT
Original Filed Aug. 2, 1949 3 Sheets-Sheet 1

Inventors
Gordon W. Johansen
Welford E. Copley
By
ATTORNEYS

Inventors
Gordon W. Johansen
Welford E. Copley

ATTORNEYS

June 28, 1955  G. W. JOHANSEN ET AL  2,711,807
REVERSING CLUTCH UNIT

Original Filed Aug. 2, 1949  3 Sheets-Sheet 3

Inventors
Gordon W. Johansen
Welford E. Copley

By

ATTORNEYS

United States Patent Office 2,711,807
Patented June 28, 1955

2,711,807

REVERSING CLUTCH UNIT

Gordon W. Johansen and Welford E. Copley, Modesto, Calif.

Original application August 2, 1949, Serial No. 108,168, now Patent No. 2,599,058, dated June 3, 1952. Divided and this application May 6, 1952, Serial No. 286,268

2 Claims. (Cl. 192—51)

This invention relates to a reversible drive mechanism initially designed for use between the engine and drive wheels of a tractor, and particularly to the specific multiple clutch assembly of such mechanism; the present application being a division of our copending application Serial No. 108,168, filed August 2, 1949, Patent No. 2,599,058, dated June 3, 1952.

The major object of this invention is to provide a reversing clutch unit of novel construction, such clutch unit comprising reversibly driven inner and outer drums, and a rotary shoe assembly between said drums adapted to be frictionally engaged with either thereof, selectively, whereby said shoe assembly is reversibly driven; there being driving connections between such shoe assembly and the corresponding, driven wheel or other rotary member.

Another object is to provide a reversing clutch unit tor the purpose which is arranged for simple and easy control to effect the reversible drive of the corresponding driven rotary member.

An additional object of the invention is to provide a reversing clutch unit which is designed for ease and economy of manufacture; the mechanism being relatively simple in structure, positive in operation, and requiring a minimum of maintenance or repair.

A still further object of the invention is to provide a practical and reliable reversing clutch unit, and one which will be exceedingly effective for the purpose for which it is designed.

These objects are accomplished by means of such structure and relative arrangement of parts as will fully appear by a perusal of the following specification and claims.

Figure 1:
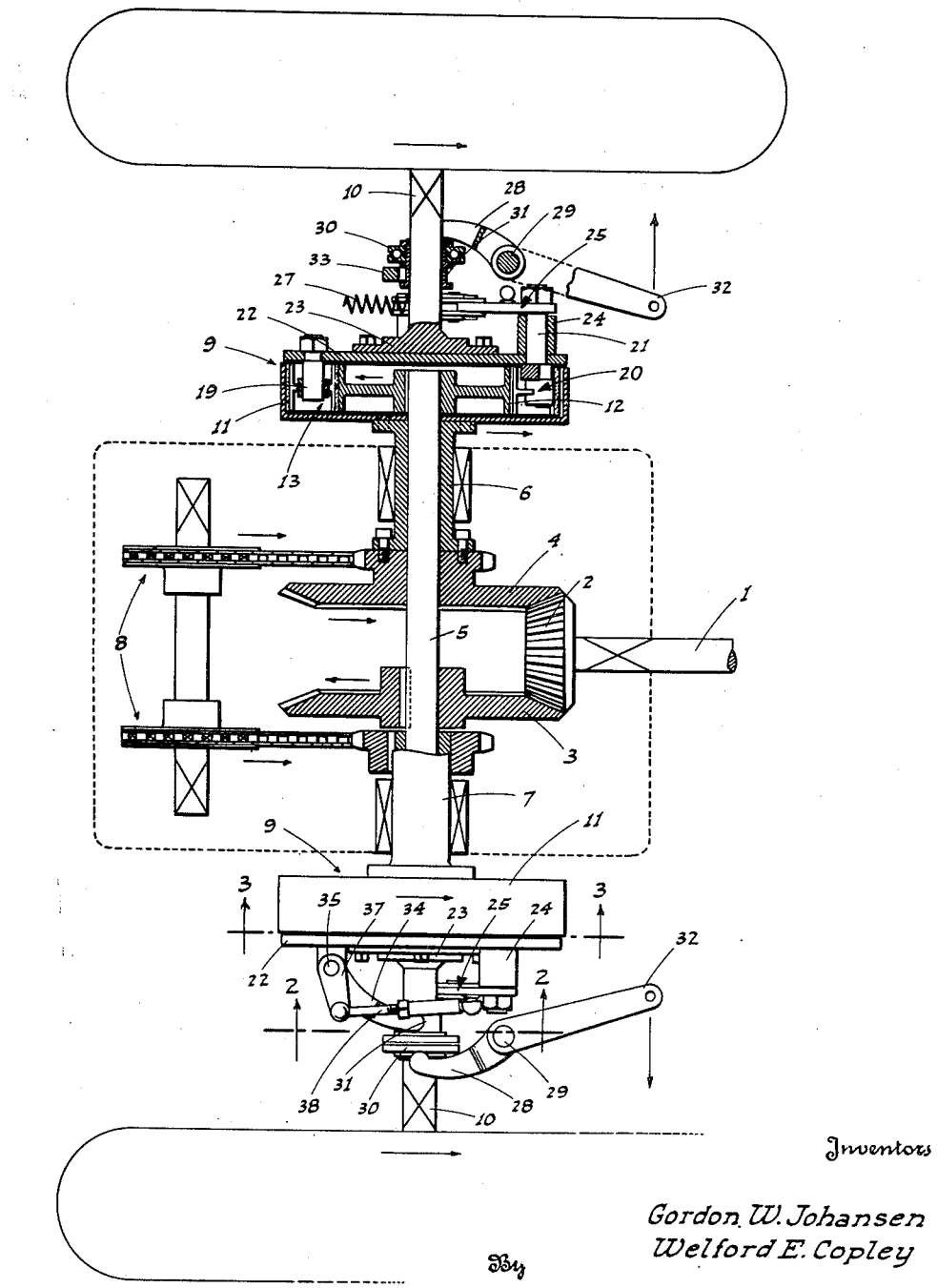
Fig. 1 is a plan view, diagrammatic in part, and sectional in part, of the reversible drive mechanism.
Figure 2:
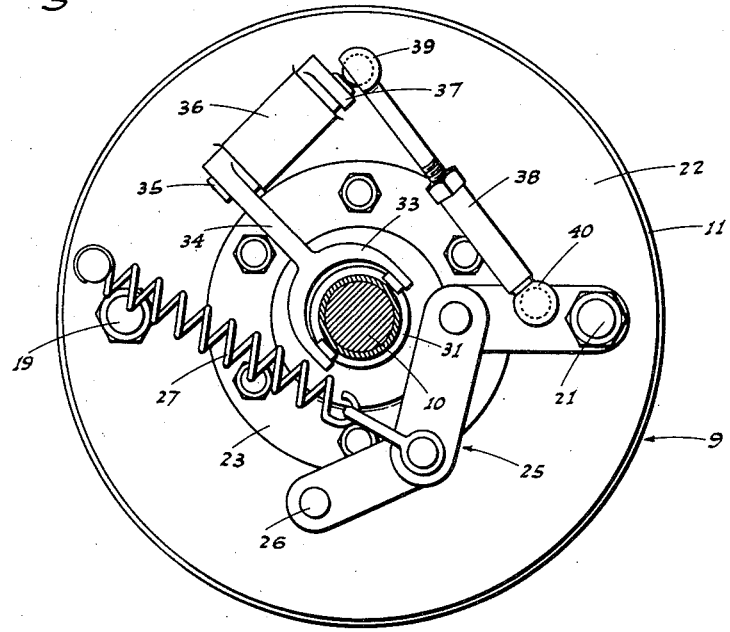
Fig. 2 is an enlarged section on line 2—2 of Fig. 1 showing the external parts of one of the reversing clutch units; such parts being in the positions occupied thereby for forward drive.
Figure 3:
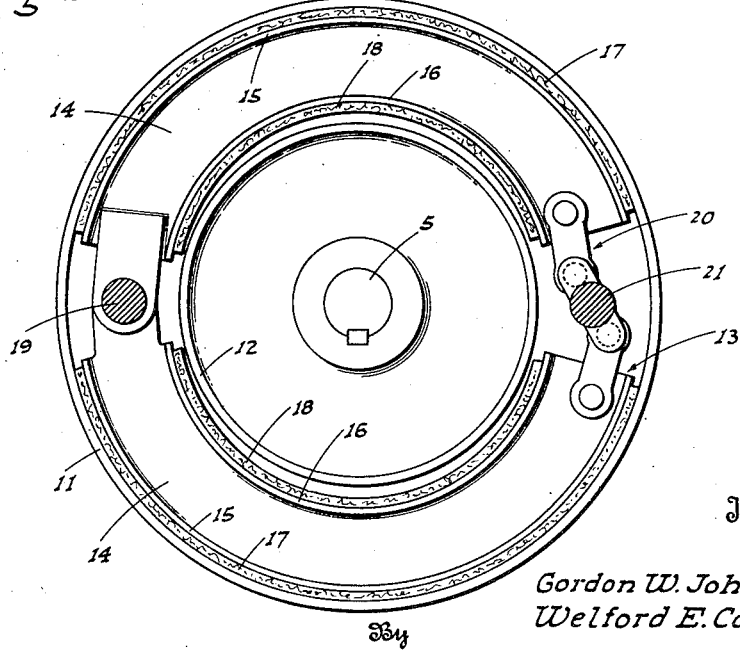
Fig. 3 is an enlarged section on line 3—3 of Fig. 1 showing the internal parts of said one reversing clutch unit; such parts being in the positions occupied thereby for forward drive.

Referring now more particularly to the characters of reference on the drawings, the reversible drive mechanism as a whole comprises a drive shaft 1 having a bevel pinion 2 on its rear end meshing with opposed bevel gears 3 and 4 mounted on an elongated cross shaft 5. Gear 3 is keyed on the shaft 5, and sleeves 6 and 7 are turnable on said shaft beyond the gears. Sleeve 6 is directly connected to gear 4 and said sleeve and gear are arranged to rotate sleeve 7 in the same direction by a suitable drive unit indicated generally at 8. With the drive mechanism as above described, sleeves 6 and 7 rotate in one direction, while the cross shaft 5 simultaneously rotates in the opposite direction.

Laterally out from each sleeve the mechanism includes a reversing clutch unit indicated generally at 9 connected in actuating relation to a driven shaft or axle 10 alined with but spaced from the corresponding end of the cross shaft 5.

As each of the reversing clutch units 9 is identical, except for being left and right hand, a description of one will suffice for both.

Each reversing clutch unit 9 comprises an outer clutch drum 11 and an inner clutch drum 12 of differential diameters; such clutch drums 11 and 12 being mounted in concentric relation whereby a substantial spacing exists between the peripheries thereof. The outer clutch drum 11 is fixed to the adjacent end of the corresponding drive sleeve 6 or 7, while the inner clutch drum 12 is keyed to the adjacent end of the cross shaft 5. Consequently, the drums 11 and 12 are constantly driven, but in reverse or opposed directions.

A rotary clutch shoe assembly, indicated generally at 13 is disposed between the outer clutch drum 11 and inner clutch drum 12; such assembly comprising a pair of substantially half-circle clutch shoes 14 which are double faced; i. e. including an outer face 15 and an inner face 16 fitted with friction lining 17 and 18 respectively.

At one end the clutch shoes 14 are connected to an anchor pin 19, and at the opposite end said shoes are connected by actuating linkage 20 which includes a rotary control pin 21 whose rotation in one direction or the other is adapted to cause expansion or contraction, respectively, of the rotary shoe assembly 13.

The anchor pin 19 and the rotary control pin 21 are also driving pins, and project through a driving disc 22 disposed in axially alined, adjacent facing relation to the outer end of the drums 11 and 12.

The shaft or axle 10 includes an inner end hub 23 affixed centrally to the driving disc 22, whereby when the rotary clutch shoe assembly 13 rotates, such motion is imparted directly to the axle 10.

The rotary clutch shoe assembly 13 is controlled as follows:

The rotary control pin 21 is elongated and projects through a bearing 24 on the driving disc 22. At its outer end the rotary control pin 21 is connected to one end of exterior control linkage 25 whose other end is pivoted to the driving disc 22, as at 26.

A tension spring 27, connected between the driving disc 22 and the control linkage 25, normally acts on said linkage to rotate the control pin 21 in a direction which causes expansion of the rotary clutch shoe assembly 13 into friction gripping relation with the outer clutch drum 11 whereby said shoe assembly rotates with such drum.

When the shoe assembly grips and is rotating with the outer drum, the drive is preferably forward, while reverse drive results from the shoe assembly gripping and rotating with the inner drum.

To shift the control linkage 25 to an intermediate or neutral position between the drums 11 and 12, or to contract said shoe assembly into gripping relation with the inner clutch drum 12 to rotate with the latter, the following arrangement is provided:

A shifting fork 28, mounted on a fixed pivot 29, works through a thrust bearing 30 to actuate a shifting sleeve 31 on the shaft or axle 10; the shifting fork 33 including a control lever 32.

Figure 4:
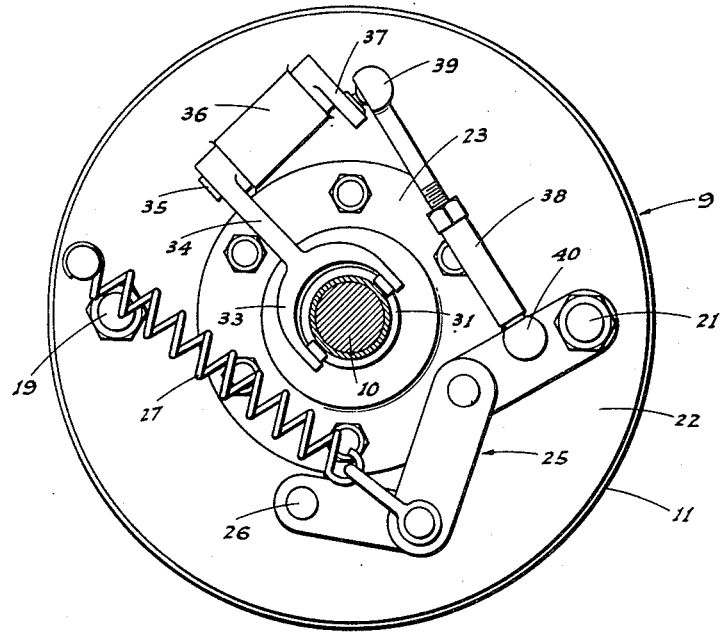
Fig. 4 is a view similar to Fig. 2, but shows the parts in the positions occupied thereby for reverse drive.
Figure 5:
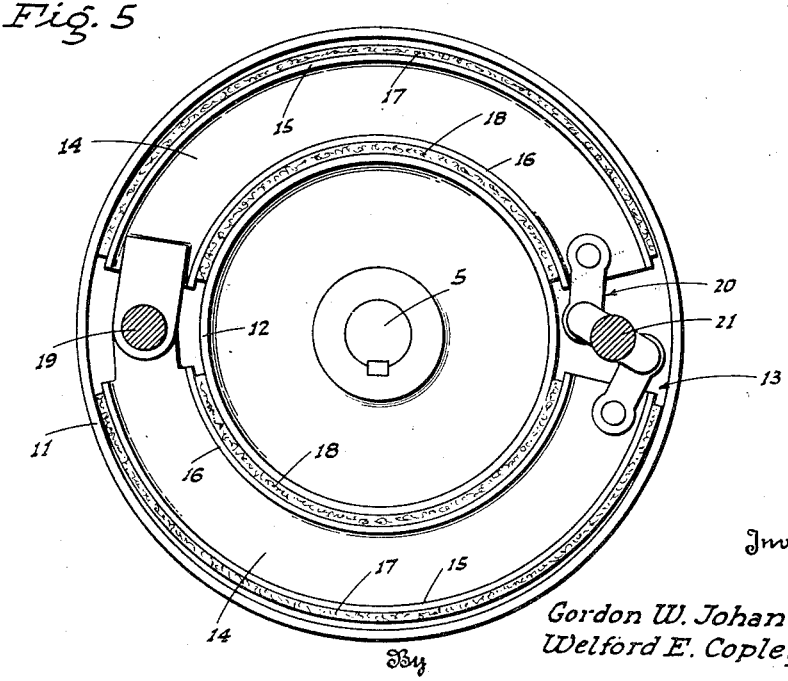
Fig. 5 is a similar view to Fig. 3, but shows the parts in the positions occupied thereby for reverse drive.

The shifting sleeve 31 cooperates with a fork 33 (see Fig. 4) adapted to be shifted back and forth by the sleeve 31; said fork 33 including a fork arm 34 fixed on one end of a stub shaft 35 which projects through a bearing 36 externally on the driving disc 22. At the end opposite the fork arm 34 the stub shaft 35 is fitted with a lever arm 37, and an adjustable control rod 38 is connected by ball and socket units 39 and 40 between the lever arm 37 and control linkage 25.

With the above arrangement the linkage 25 is positively and effectively controlled from the lever 32 so that the rotary clutch shoe assembly 13 may be allowed to expand to grip the outer clutch drum 11, contracted to grip the inner clutch drum 12, or set in a neutral position in non-gripping relation to both of said drums.

Thus, by predetermined movement of the control lever 32 a positive and effective drive, forward or reverse, may be imparted to the corresponding axle 10 through the clutch unit 9, or said unit may be set in neutral.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention as defined by the appended claims.

Having thus described the invention, the following is claimed as new and useful, and upon which Letters Patent are desired:

1. A reversible drive mechanism for a shaft, comprising two concentric drums spaced apart radially, means to simultaneously rotate said drums in opposite directions, a disc on the shaft facing the edges of the drums and overlapping the space therebetween, a pin anchored in the disc adjacent the periphery thereof, such pin projecting into the space between the drums, a pair of arcuate clutch shoes in such space, each shoe being pivoted at one end on said pin, the opposite ends of the shoes terminating at a point substantially diametrically of the pin relative to the disc axis, linkage connecting said other ends of the shoes and being operative to selectively swing said shoes into frictional contact with either drum, and means mounted on the disc operative to effect the said operation of the linkage.

2. A drive mechanism as in claim 1 in which said last named means comprises a control pin journaled in the disc and operatively connected with said linkage, other linkage mounted on the disc and connected with the control pin and operative to oscillate the latter about its longitudinal axis, a crank which includes a shaft journaled on the disc, a sleeve slidable axially of the disc, means to reciprocate the sleeve, a fork embracing the sleeve and swingable with the reciprocation of the sleeve, such fork being operatively connected with the crank shaft, a control rod, a universal connection between one end of the control rod and the crank, and a universal connection between the other end of the control rod and the said other linkage which is connected with the control pin.

References Cited in the file of this patent

UNITED STATES PATENTS

| | | |
|---|---|---|
| 1,559,944 | Emrick | Nov. 3, 1925 |
| 1,643,473 | Ross | Sept. 27, 1927 |
| 2,599,058 | Johansen et al. | June 3, 1952 |